United States Patent [19]

Kataoka et al.

[11] 4,432,244
[45] Feb. 21, 1984

[54] FLOW RATE TRANSDUCER

[75] Inventors: Masami Kataoka, Kariya; Nobumasa Higo, Toyota, both of Japan

[73] Assignee: Nippondenso Co., Ltd., Kariya, Japan

[21] Appl. No.: 382,118

[22] Filed: May 26, 1982

[30] Foreign Application Priority Data

May 29, 1981 [JP] Japan .................................. 56-78927

[51] Int. Cl.³ ............................ G01F 1/06; G01F 1/08
[52] U.S. Cl. ................................ 73/861.77; 73/861.82
[58] Field of Search ............ 73/861.33, 861.77, 861.78, 73/861.79, 861.81, 861.87

[56] References Cited

U.S. PATENT DOCUMENTS

| | | | |
|---|---|---|---|
| 3,867,840 | 2/1975 | Baatz. | |
| 3,937,081 | 2/1976 | Dabanian et al. | 73/861.33 |
| 4,131,017 | 12/1978 | Back | 73/861.79 |
| 4,161,879 | 7/1979 | Dunne, Jr. | 73/861.81 |
| 4,389,902 | 6/1983 | Kataona et al. | 73/861.77 |

Primary Examiner—Herbert Goldstein
Attorney, Agent, or Firm—Cushman, Darby & Cushman

[57] ABSTRACT

A flow rate transducer has a housing in which a cylindrical fluid chamber and a support portion surrounded by an annular guide groove formed coaxial with the fluid chamber are formed. Rotatably carried by the support portion is a vane wheel having plate pieces arranged circumferentially of the vane wheel at regular intervals and extending in the guide groove. A light emitting element and a light receiving element are disposed to face a locus defined by the rotated plate pieces so that, every time the plate pieces pass by the light receiving element, the light receiving element produces an electrical signal to measure the flow rate of a fluid in the fluid chamber. The support portion has vane wheel speed adjusting chambers each having an L-shaped configuration and opening to said guide groove for minimizing the flow rate measurement errors of the flow rate transducer both in the high and low rate regions.

10 Claims, 6 Drawing Figures

FLOW RATE TRANSDUCER

BACKGROUND OF THE INVENTION

This invention relates to a flow rate transducer, more specifically to a tangential flow-in, vane type flow rate transducer for optically electrically measuring the flow rate of fuel, such as fuel supplied to the internal combustion engine of an automobile.

A prior art flow rate transducer of this type is so constructed that a vane wheel in a housing is rotated by a fluid tangentially introduced through a fluid inlet into a cylindrical fluid chamber in the housing and circulating the fluid in the fluid chamber, shielding plates are formed on the vane wheel at right angles to the plane of rotation thereof and arranged circumferentially at regular intervals, and a light emitting element and a light receiving element face each other with the locus of rotation of the shielding plates between them.

When the vane wheel is rotated by the circulation of the fluid in the fluid chamber, the shielding plates also rotate to intercept light beams emitted from the light emitting element toward the light receiving element. The rate of the light beam interception is converted into electric signals by a transducer circuit to determine the rotating speed of the vane wheel. Thus, the flow rate of the fluid which is substantially proportional to the rotating speed of the vane wheel would be obtained from said rotating speed and is displayed.

It has been known, however, that the flow rate transducer of this type is liable to cause errors between the actual values of flow rate and measured values, as shown by curve D in FIG. 6. The errors tend always to appear as large negative values in a low flow rate region and as large positive values in a high flow rate region.

Such large errors between the measured values and actual values would lower the reliability of the flow rate transducer. It is therefore essential to improve the flow rate measuring characteristic of the flow rate transducer.

SUMMARY OF THE INVENTION

The object of this invention is to provide a flow rate transducer simplified in construction and improved in flow rate measuring accuracy.

A flow rate transducer according to this invention includes a housing having a cylindrical fluid chamber, a fluid inlet formed tangentially to the fluid chamber, and a fluid outlet connected with the fluid chamber. Disposed in the housing is a support portion surrounded by an annular groove which faces one end of the fluid chamber and is coaxial therewith. A vane wheel is rotatably supported at its center by the support portion in the fluid chamber. The vane wheel is provided with vanes radially extending on its opposite side to the support portion and is also provided with plate pieces circumferentially arranged on the support-portion-side surface of the vane wheel at regular intervals and extending into the annular groove. A light emitting element and a light receiving element which constitute rotation detecting means are arranged in the housing so as to face each other with the annular groove disposed therebetween or positioned on the same side of the annular groove. Flow rate can be measured by the frequency of interception of light by the plate pieces in unit time and the frequency of reflection of a light beam from the light emitting element to the light receiving element by the plate pieces in unit time for the former and latter cases, respectively.

Formed in the support portion is a notch-shaped vane wheel speed adjusting chambers opened to both the annular groove and the fluid chamber.

The vane wheel speed adjusting chambers are intended to prevent lag of rotation of the vane wheel in the low flow rate region and faster rotation than that corresponding to the flow rate in the high flow rate region.

BRIEF DESCRIPTION OF THE DRAWINGS

This invention will be fully understood from the following detailed description with reference to the accompanying drawings, in which.

DETAILED DESCRIPTION OF THE PREFERRED EMBODIMENT

Figure 1:
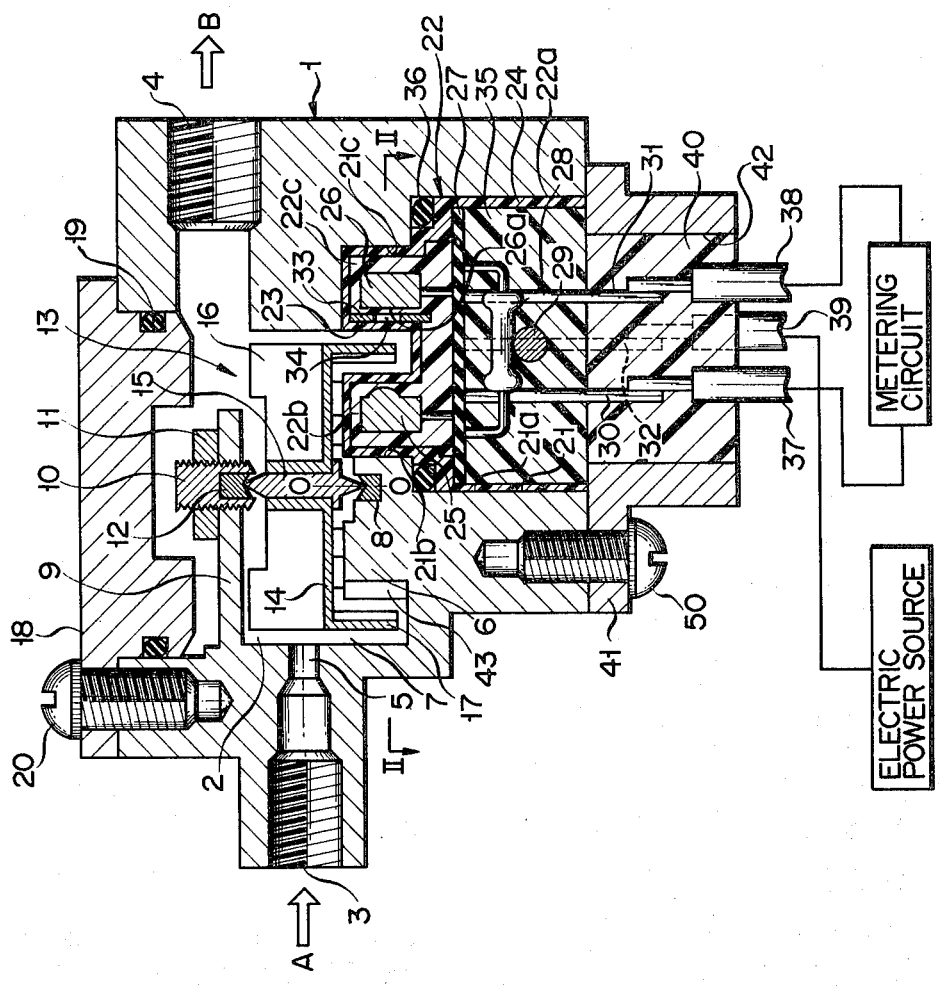
FIG. 1 is a vertical sectional view of a flow rate transducer according to one embodiment of this invention.

Referring now to FIG. 1, a housing 1 has a vertical cylindrical fluid chamber 2, a fluid inlet 3 communicating with the fluid chamber 2, and a fluid outlet 4 communicating with the fluid chamber 2 on the opposite side of the fluid chamber 2 to the fluid inlet 3. The fluid inlet 3 is reduced in diameter at the portion adjoining the fluid chamber 2 to form an orifice portion 5 which opens to and is disposed substantially tangentially to the fluid chamber 2 (see FIG. 2).

A support portion 6 is formed at that portion of the housing 1 which constitutes the bottom of the fluid chamber 2 so as to be surrounded by an annular guide groove 7 coaxial with the fluid chamber 2. A pivot bearing 8 is embedded in the center of the upper end portion of the support portion 6. A support arm 9 extends diametrically of the support portion 6 from the inner wall of the upper portion of the fluid chamber 2, and an adjustable screw rod 10 coaxial with the fluid chamber 2 is threadably screwed in the support arm 9 so as to be fixed thereto by means of a lock nut 11. Another pivot bearing 12 is embedded in the center of the lower end of the adjustable screw rod 10 coaxially facing the pivot bearing 8 in the support portion 6.

Figure 3:
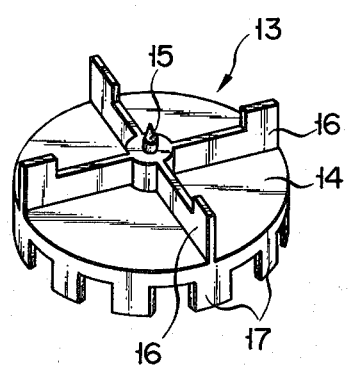
FIG. 3 is a perspective view of a vane wheel used in the embodiment of FIG. 1.

Referring to FIGS. 1 and 3, a vane wheel generally designated at numeral 13 comprises a rotary disc 14, a center shaft 15 pointed at both ends to serve also as pivots, vanes 16 formed radially on the upper surface of the rotary disc 14, and plate pieces 17 perpendicularly hanging from the outer peripheral edge of the rotary disc 14 and arranged circumferentially of the rotary disc 14 at regular intervals.

By adjusting the adjustable screw rod 10, pivots at both ends of the center shaft 15 of the vane wheel 13 are received by the pivot bearings 8 and 12 so that the vane wheel 13 is rotatably set in the fluid chamber 2. In this state, the plate pieces 17 extend into the annular groove 7.

The top of the fluid chamber 2 is covered with an upper cover 18 which is fixed to the housing 1 by a fixing screw 20 such that the upper cover 18 seals the fluid chamber 2 from the atmosphere by means of a sealing member 19 such as an O-ring fitted in the lateral wall of the upper cover 18.

Formed in the housing 1 is a light emitting and receiving element assembly mounting hole 21 which comprises a circular cavity 21a formed in the bottom of the housing 1, a square cavity 21b extending from the top of the circular cavity 21a in the support portion 6, and another square cavity 21c extending from the top portion of the circular cavity 21a and facing the square cavity 21b in the portion of the housing 1 which is outside of the annular groove 7.

A light detecting element assembly generally designated at numeral 22 comprises a cylindrical portion 22a complementary to the cylindrical cavity 21a, and a light emitting element housing portion 22b and a light receiving element housing portion 22c protruding from the upper end of the cylindrical portion 22a and fitted in the square cavities 21b and 21c, respectively, so as to be located inside and outside, respectively, of a groove 23 which is so formed as not to interfere with the annular groove 7 when the assembly 22 is set in the mounting hole 21. A bottomless casing 24 of the light detecting element assembly 22 is made of a transparent molding material, such as transparent nylon, which has a configuration substantially complementary to that of the mounting hole 21.

A light emitting element 25 formed of, e.g., an infrared luminescent diode and a light receiving element 26 formed of, e.g., a photo transistor are disposed opposite to each other in the light emitting element receiving portion 22b and the light receiving element receiving portion 22c of the casing 24, respectively. Both of the elements 25 and 26 are fixed to a printed board 27 set in the casing 24. Also fixed to the printed board 27 are resistors 28 and 29 connected electrically in parallel with the elements 25 and 26, respectively, and lead wires 30, 31 and 32 connected with the resistors 28 and 29. A lead wire connected to the opposite end of the resistor 29 to the end thereof to which the lead wire 32 is connected is omitted in FIG. 1.

In the light receiving element housing portion 22c, a light control plate 33 with a slit 34 is disposed on the side of a light receiving surface 26a of the light receiving element 26, said receiving surface 26a facing the groove 23. The components 25 to 31 and 33 are fixed in the casing 24 by filling a transparent insulating resin 35, e.g., epoxy resin in the casing 24. The light detecting assembly 22 is fitted in the mounting hole 21 in a fluid-tight manner with the aid of a sealing member such as an O-ring 36 which surrounds the lateral wall of the assembly 22. The lead wires 30, 31 and 32, etc. project from the lower surface of the assembly 22, and their projected ends are connected to their corresponding ends of other lead wires 37, 38 and 39, etc. The projected ends of the lead wires 30, 31 and 32 and their corresponding ends of the lead wires 37, 38 and 39 are in an insulating resin, such as epoxy resin, molded to form a ring-shaped connecting portion 40 which is concentric with the lower end of the assembly 22 and smaller than the same in diameter. The connecting portion 40 is integral with the assembly 22.

The lead wires 37 and 38 are connected with a metering circuit, and the lead wire 39 and its corresponding lead wire are connected with an electric power source.

A holder 41 having a hole 42 with the same diameter as that of the ring-shaped connecting portion 40 is fixed to the lower end of the housing 1 by means of a fixing screw 50, thereby keeping the assembly 22 from slipping out of the housing 1.

Figure 2:
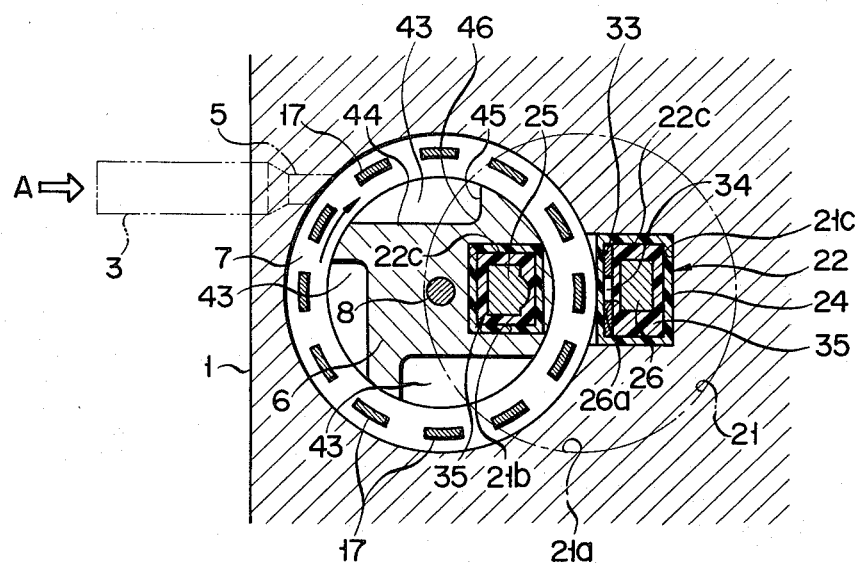
FIG. 2 is a sectional view taken along line II—II of FIG. 1.
Figure 4:
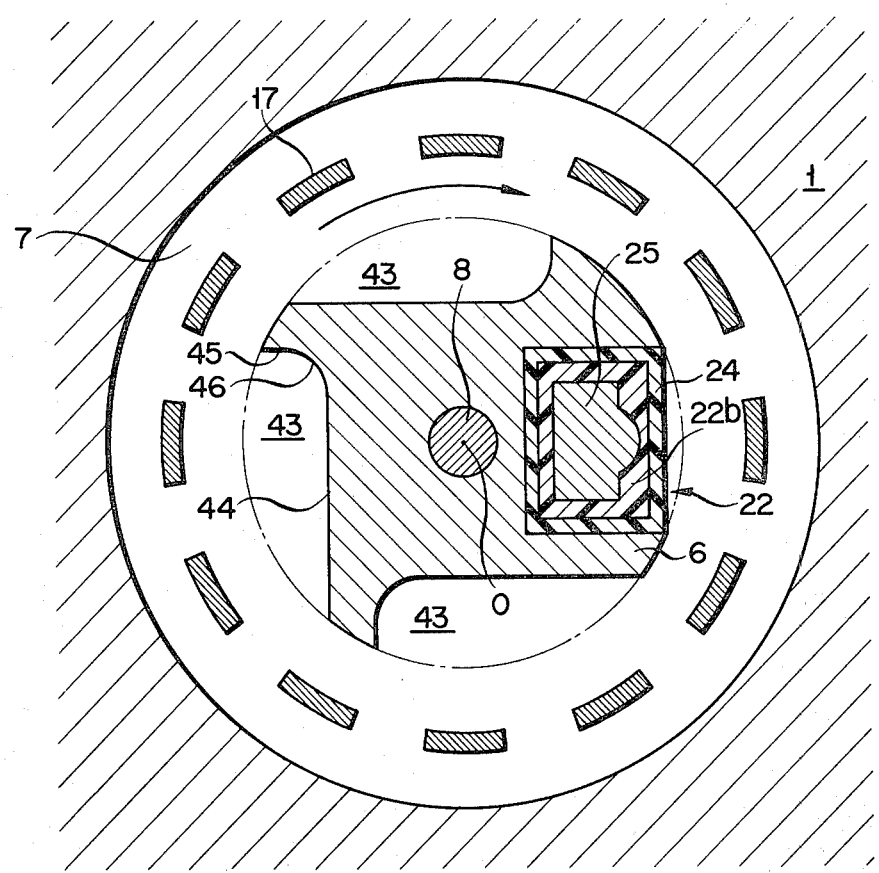
FIG. 4 is an enlarged view of the principal part of the vane wheel shown in FIG. 3.

Referring now to FIGS. 1, 2 and 4, vane wheel speed adjusting chambers 43 each in the form of a substantially L-shaped notch and continuous with the fluid chamber 2 and the annular groove 7 are formed in the lateral wall of the support portion 6. Each of the adjusting chambers 43 comprises a plane portion 44 extending parallel with the central axis O—O of the support portion 6 from the lateral wall thereof on the upper course side of a fluid flow in the annular groove 7 so as to extend into the support portion 6, a plane portion 45 located on the lower course side of the plane portion 44 of the fluid flow at substantially right angles to the plane portion 44 and parallel to the central axis O—O and extending up to the inner lateral wall of the annular groove 7, and an arcuate surface portion 46 contacting with the two plane portions 44 and 45.

In operation, a fluid, such as fuel for an internal combustion engine, introduced through the fluid inlet 3 as indicated by arrow A in FIG. 1 is increased in its speed as it passes through the orifice portion 5, tangentially led into the fluid chamber 2 to hit against the vanes 16 of the vane wheel 13 to rotate it and then discharged from the fluid outlet 4 as indicated by arrow B. As the vane wheel 13 rotates, the plate pieces 17 also rotate. When one of the plate pieces 17 is interposed between the light emitting element 25 and the light receiving element 26, it intercepts a light beam emitted from the light emitting element 25 toward the light receiving element 26. With every interception of the light beam by each plate piece 17, an electric signal from the light receiving element 26 is transmitted through the resistor 28 and the lead wires 37 and 38 to the metering circuit, which measures the flow rate.

Part of the fluid introduced into the fluid chamber 2 flows into the annular groove 7, flows in the groove 7 in the same manner as the fluid in the fluid chamber 2, and part of it flows into the vane wheel speed adjusting chambers 43. Thus, with use of the notch-shaped vane wheel speed adjusting chambers 43 in the support portion 6, measurement errors of the flow rate transducer in both low and high flow rate regions become smaller than those of the prior art flow rate transducer.

Figure 6:
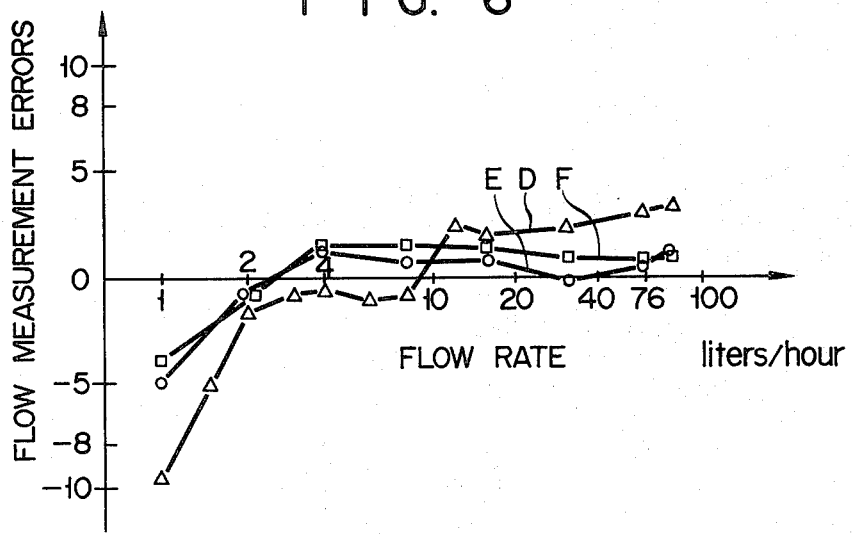
FIG. 6 is a diagram showing the flow rate measurement error characteristics of a prior art flow rate transducer and the two embodiments of this invention.

The flow rate measurement error characteristic of the flow rate transducer having the three speed adjusting chambers 43 is represented by curve E in FIG. 6, wherein the ratio among the diameter of the support portion 6, the vertical distance from the center 0 of the support portion 6 to the plane portion 44, the vertical distance from the center 0 of the support portion 6 to the plane portion 45, and the radius of curvature of the arcuate surface portion 46 is 15:4.5:3:1.5. As seen from FIG. 6, the flow rate measurement error characteristic of this embodiment is better than that of the prior art flow rate transducer as represented by curve D. Namely, the flow measurement errors of this embodiment in both high and low flow rate regions are half of or less than those of the prior art flow rate transducer. In this case, the vertical distance from the center 0 of the support portion 6 to the plane portion 44 was 4.5 mm.

Figure 5:
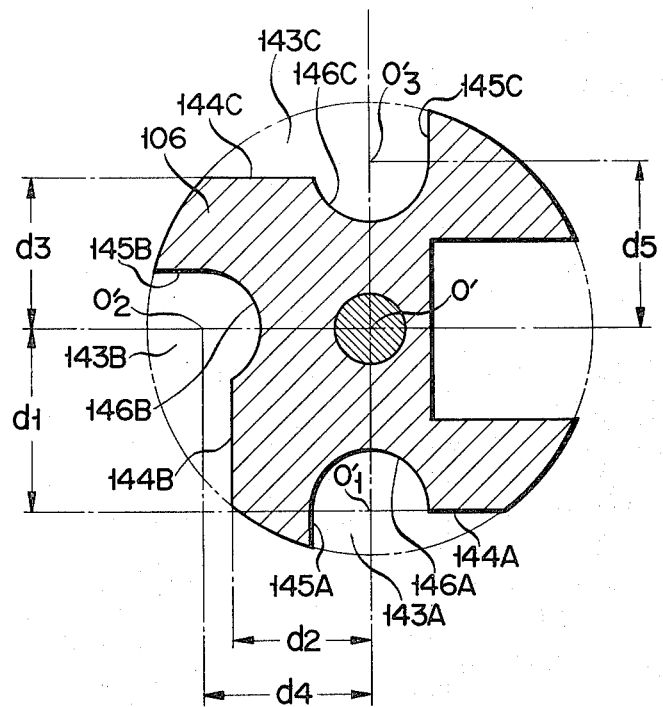
FIG. 5 is a plan sectional view of a support portion according to another embodiment of the invention.

FIG. 5 shows a support portion 106 according to another embodiment. In this embodiment, the support portion 106 has three vane wheel speed adjusting chambers 143A, 143B and 143C. The vane wheel speed adjusting chambers are each in the form of an L-shaped notch bulging at their bent portion. Namely, the chambers 143A, 143B and 143C comprise, respectively, plane portions 144A, 144B and 144C so formed as to cut into the lateral wall of the support portion 106 at the upper course side of the fluid flow in the guide groove 7 and extending parallel with the central axis (including point O') of the support portion 106 at vertical distances $d_1$, $d_2$ and $d_3$ therefrom, respectively, plane portions 145A, 145B and 145C located on the lower course side of the plane portions 144A, 144B and 144C and extending at right angles to the plane portions 144A, 144B and 145C up to the inner wall of the guide groove 7, respectively, and arcuate surface portions 146A, 146B and 146C having their central axes $O'_1$, $O'_2$ and $O'_3$ which lie within their corresponding chambers 143A, 143B and 143C on those radial planes of the support portion 106 and which are parallel with the plane portions 145A, 145B and 145C. The arcuate surface portions 146A, 146B and 146C contact with the plane portions 145A, 145B and 145C, and intersect the plane portions 144A, 144B and 144C, respectively. In this embodiment, the central axis $O'_1$ is on the extension of the plane portion 144A, while the central axes $O'_2$ and $O'_3$ are at distances $d_4$ and $d_5$, respectively, from the central axis of the support portion 106.

The flow rate measurement error characteristic of the flow rate transducer having the support portion 106 is represented by curve F in FIG. 6, wherein the ratio among the diameter of the support portion 106, the distance $d_1$, the distance $d_2$, the distance $d_3$, the distance $d_4$, the distance $d_5$ and the radii of curvature of the arcuate surface portions 146A, 146B and 146C is 15:6:4.5:5.5:5.5:2. Like the embodiment shown in FIG. 4, as seen from FIG. 6, the latter embodiment is much improved in the flow rate measurement error characteristic as compared with the prior art flow rate transducer. In this case, the radius of curvature of the arcuate surface portions 146A, 146B and 146C was 2 mm.

In order to explain the reason why the vane speed adjusting chambers reduce the measurement errors, the inventor assume as follows:

In the low flow rate region, the vane wheel speed adjusting chambers widen the annular groove to reduce the viscosity resistance of the fluid flowing in the annular guide groove to the lateral walls of the annular groove, thereby preventing the rotating speed of the vane wheel from becoming lower than the flow rate of the fluid. In the high flow rate region, on the other hand, part of the fluid led into the vane wheel speed adjusting chambers causes a turbulent flow in the adjusting chambers and the annular guide groove or flow along the plane portions 45 or 145A, 145B and 145C into the annular guide groove to hit against the fluid flowing in the annular groove, thereby reducing the speed of the fluid flow in the annular guide groove to brake the plate pieces 17 of the vane wheel 13. As a result, the rotational speed of the vane wheel 13 whose inertia tends to rotate it faster than the fluid flow in the fluid chamber 2 in the high flow rate region is decreased.

In the above-mentioned embodiments, the light emitting element and the light receiving element are disposed inside and outside, respectively, of the annular guide groove. The positions of the two elements may be changed. Alternatively, both elements may be arranged together on the inside or outside of the annular guide groove and that surface of each of the plate pieces which faces both the elements is made to form a reflecting surface, whereby, every time the light receiving element receives the light reflected by the reflecting surface, it produces an electric signal to allow the flow rate circuit to measure the flow rate of the fluid.

Furthermore, in the above-mentioned embodiment, the light emitting element and the light receiving element jointly acting as rotation detecting means may be replaced by a magnetically detecting device comprising a permanent magnet and a pick-up coil, wherein a magnetic flux of the permanent magnet is interrupted by the rotation of the plate pieces of the vane wheel and the interruption of the magnetic flux is detected by the pick-up coil.

What we claim is:

1. A flow rate transducer comprising:
    a housing in which are formed a cylindrical fluid chamber, a fluid inlet substantially tangentially connected to said fluid chamber and a fluid outlet connected to said fluid chamber;
    a support portion which is surrounded by an annular guide groove formed coaxially with said fluid chamber in said housing and communicating with said fluid chamber;
    a vane wheel which is rotatably and coaxially supported by said support portion in said fluid chamber;
    plate pieces formed on that end face of said vane wheel which are disposed in said guide groove and are arranged circumferentially of said vane wheel at regular intervals;
    rotation detecting means disposed adjacent to said guide groove for detecting that each of said plate pieces passes by said detecting means; and
    notch-shaped vane wheel speed adjusting chambers formed in said support portion to communicate with said guide groove and said fluid chamber for making the rotational speed of said vane wheel substantially equal to the flow rate of a fluid in said fluid chamber.

2. The transducer according to claim 1, wherein said rotation detecting means comprises a light emitting element and a light receiving element having a light receiving surface, said light emitting element, said light receiving element and said light receiving surface being arranged to face said guide groove such that, every time each of said plate pieces passes by said light receiving surface as said vane wheel is rotated, each of said plate pieces acts on said light to enable said light receiving element to produce an electric signal.

3. The transducer according to claim 2, wherein each of said vane wheel speed adjusting chambers comprises a first plane portion formed parallel with the central axis of said support portion in said support portion and a second plane portion formed at right angles with said first plane portion and extending up to the inner lateral wall of said guide groove.

4. The transducer according to claim 3, wherein each of said vane wheel speed adjusting chambers further comprises an arcuate surface portion connecting said first and second plane portions.

5. The transducer according to claim 4, wherein said first plane portion is located on the upper course side of said second plane portion with respect to the flow of the fluid in said annular groove.

6. The transducer according to claim 5, wherein said arcuate surface portion contacts said first and second plane portions.

7. The transducer according to claim 6, wherein said vane wheel speed adjusting chambers are three in number, and the ratio among the diameter of said support portion, the vertical distance from the central axis of said support portion to said first plane portion, the vertical distance from the central axis of said support portion to said second plane portion, and the radius of curvature of said arcuate surface portion is 15:4.5:3:1.5.

8. The transducer according to claim 5, wherein said arcuate surface portion intersects said first plane portion and contacts with said second plane portion.

9. The transducer according to claim 8, wherein the central axis of said arcuate surface portion is on that radial plane of said support portion which is parallel with said second plane portion.

10. The transducer according to claim 9, wherein said vane wheel speed adjusting chambers are three in number, and the ratios among the diameter of said support portion, the vertical distances from the central axis of said support portion to said first plane portions, the vertical distances from the central axis of said support portion to said second plane portions, the distance between the respective central axes of said arcuate surface portions and said support portion, and the radius of curvature of said arcuate surface portions in said three vane wheel speed adjusting chambers, as given in the order of arrangement viewed from the upper course side of the fluid flow in said annular groove are 15:6:2:6:2; 15:4.5:2:5.5:2; and 15:5:2:5.5:2, respectively.

* * * * *